United States Patent
Lindgren et al.

(10) Patent No.: US 9,184,947 B2
(45) Date of Patent: Nov. 10, 2015

(54) CONTROLLABLE FILTER TO DIAGONALIZE A TRANSMISSION CHANNEL

(75) Inventors: Ulf Lindgren, Vastra Frolunda (SE); Henrik Sahlin, Molnlycke (SE)

(73) Assignee: Telefonaktiebolaget L M Ericsson(publ), Stockholm (SE)

( * ) Notice: Subject to any disclaimer, the term of this patent is extended or adjusted under 35 U.S.C. 154(b) by 84 days.

(21) Appl. No.: 13/502,432

(22) PCT Filed: Oct. 20, 2009

(86) PCT No.: PCT/EP2009/063725
§ 371 (c)(1),
(2), (4) Date: Apr. 17, 2012

(87) PCT Pub. No.: WO2011/047713
PCT Pub. Date: Apr. 28, 2011

(65) Prior Publication Data
US 2012/0219098 A1    Aug. 30, 2012

(51) Int. Cl.
*H04L 27/06*    (2006.01)
*H04L 25/03*    (2006.01)
*H04L 25/02*    (2006.01)

(52) U.S. Cl.
CPC .... *H04L 25/03114* (2013.01); *H04L 25/03993* (2013.01); *H04L 25/0242* (2013.01)

(58) Field of Classification Search
CPC . H04L 25/067; H04L 1/0045; H04L 27/2647; H04L 1/005; H04L 1/0054; H04L 1/20; H04N 5/4401; H04B 1/30; H04B 1/28
USPC ......... 375/340, 316, 343, 346, 350, 219, 232, 375/348, 349
See application file for complete search history.

(56) References Cited

U.S. PATENT DOCUMENTS

2003/0031264 A1    2/2003    Barry et al.
2003/0218973 A1    11/2003    Oprea et al.
(Continued)

FOREIGN PATENT DOCUMENTS

CN    101379724 A    3/2009
WO    2008/051128 A1    5/2008

OTHER PUBLICATIONS

Office Action issued by the State Intellectual Property Office of China in corresponding Appln. No. 200980162137.4, dated May 5, 2014, 6 pages.
(Continued)

*Primary Examiner* — Zewdu Kassa
(74) *Attorney, Agent, or Firm* — Rothwell, Figg, Ernst & Manbeck, P.C.

(57) ABSTRACT

The present invention relates to a node (1) in a wireless communication network, where the node (1) is arranged to receive at least two signals ($y_1(n)$, $y_2(n)$) which correspond to at least two transmitted uncorrelated signal streams ($x_1(n)$, $x_2(n)$) which have been transmitted to the node via a channel. The channel (2) is signals represented by means of a channel matrix ($H(q^{-1})$). The node (1) comprises a controllable filter structure (3) that is arranged to diagonalize the channel matrix ($H(q^{-1})$) such that a channel matrix estimation ($\hat{H}(q^{-1})$) may be obtained. The present invention also relates to a corresponding method.

16 Claims, 2 Drawing Sheets

(56) References Cited

U.S. PATENT DOCUMENTS

| | | | |
|---|---|---|---|
| 2004/0076112 A1* | 4/2004 | Chen | 370/208 |
| 2004/0165684 A1* | 8/2004 | Ketchum et al. | 375/343 |
| 2007/0211813 A1 | 9/2007 | Talwar et al. | |
| 2010/0067596 A1* | 3/2010 | Park et al. | 375/262 |
| 2011/0051867 A1* | 3/2011 | Azadet et al. | 375/350 |

OTHER PUBLICATIONS

Search Report cited in Chinese Application No. 200980162137.4 dated Feb. 9, 2015, 2 pages.

English language text of Second Office Action of Application No. 200980162137.4, Feb. 9, 2015, 7 pages.

\* cited by examiner

CONTROLLABLE FILTER TO DIAGONALIZE A TRANSMISSION CHANNEL

CROSS REFERENCE TO RELATED APPLICATION(S)

This application is a 35 U.S.C. §371 National Phase Entry Application from PCT/EP2009/063725, filed Oct. 20, 2009, designating the United States and. The above identified application is incorporated by reference herein in its entirety.

TECHNICAL FIELD

The present invention relates to a node in a wireless communication network, where the node is arranged to receive at least two signals which correspond to at least two transmitted uncorrelated signal streams which have been transmitted to the node via a channel, which channel is represented by means of a channel matrix.

The present invention also relates to a method for a node in a wireless communication network, where the method comprises the step of receiving at least two signals at the node, which signals correspond to at least two transmitted uncorrelated signal streams which have been transmitted to the node via a channel, which channel is represented by means of a channel matrix.

BACKGROUND

In wireless communication systems, a transmitted signal is distorted due to dynamic properties of a radio channel through which it is transmitted. In order to compensate for the dynamic properties of the radio channel, different methods are available for combating interference. An ideal compensation would completely cancel the effects of the radio channel and the resulting equalized channel would be completely frequency flat. However, such a scheme would in most cases lead to unwanted noise amplification limiting the performance. Equalization schemes must therefore provide a trade-off between noise amplification and making the equalized channel frequency-flat.

For the transmitted data to be recovered at the receiver it is important that the interference is suppressed. Besides the power consumption aspect of the user equipment, there is also a desire to restrict the size and costs of the user equipment in order for it to be attractive. The desire to reduce size, cost and power consumption is valid also for receivers in the base station. The space for and costs of processing circuitry should therefore be kept at a minimum. The complexity of the methods used for combating the interference competes with a desire to cancel the interference to as large extent as possible.

Normally, the channel is estimated, where the estimation is based on so-called pilot sequences. A pilot sequence is a sequence that is known to both ends in a communication system. A consequence is that parts of the air interface resources (spectrum, time, codes) are occupied with pilots, and can then not be used for transmitting data. However, transmitting pilot sequences enables the system to optimize the bandwidth used for transmitting user data.

Each pilot sequence is only transmitted during certain time and frequency periods, and a consequence of this is that as time progresses, the estimate becomes less good due to a variation of the channel. Differently stated, it means that the error of the channel estimate increase as a function of time. One implication of an error increase is that the user data through-put decrease. Also, pre-coders suffer in terms of less reliable weights. That is, there is a larger uncertainty regarding where to place the antenna beam energy.

In case an underlying channel model is used to interpolate intermediate channel outcomes, it is crucial to change the model based on environment and user behaviour. This results in computationally complex algorithms in which various parameters such as Doppler shift, Doppler spread and delay spread are needed components. The quality of the estimation is, naturally, depending on how well the model can describe the underlying channel behaviour.

In view of the above, it is desirable to provide an enhanced estimation of a channel by using pilot sequences, which is not as vulnerable to passing time as for presently employed channel estimation.

SUMMARY

It is thus an object of the present invention to provide an enhanced estimation of a channel starting from received pilot sequences, which is not as vulnerable to passing time as for presently employed channel estimation.

Said object is obtained by means of a node in a wireless communication network, where the node is arranged to receive at least two signals which correspond to at least two transmitted uncorrelated signal streams which have been transmitted to the node via a channel, which channel is represented by means of a channel matrix. The node comprises a controllable filter structure that is arranged to diagonalize the channel matrix such that a channel matrix estimation may be obtained.

Said object is also obtained by means of a method for a node in a wireless communication network, where the method comprises the steps: receiving at least two signals at the node, which signals correspond to at least two transmitted uncorrelated signal streams which have been transmitted to the node via a channel, which channel is represented by means of a channel matrix, and diagonalizing the channel matrix using a controllable filter structure such that a channel matrix estimation may be obtained.

According to one aspect, the received signals comprise noise, where the node is arranged to pre-whiten the received signals such that the noise is transformed to a temporal and spatial white sequence.

The pre-whitened received signals may written as $$P(q^{-1}) \cdot y(n) \uparrow P(q^{-1}) \cdot H(q^{-1}) \cdot x(n) + \tilde{w}(n),$$

where $P(q^{-1})$ is a pre-whitening matrix, $y(n)$ is a vector comprising the received signals $(y_1(n), y_2(n))$, $x(n)$ is a vector comprising the transmitted signals $(x_1(n), x_2(n))$ and $\tilde{w}(n)$ is the transformed noise.

According to another aspect, the controllable filter structure has filter output signal streams that correspond to said transmitted uncorrelated signal streams, where the filter structure is controlled such that the filter output signal streams are essentially uncorrelated. From the characteristics of the controllable filter structure at a certain moment, the channel matrix estimation is calculated for that moment.

According to another aspect, the filter output signal streams may be written as $$s(n) = D(q^{-1}) \cdot \tilde{H}(q^{-1}) \cdot x(\tilde{n}),$$

where $s(n)$ is a vector comprising the filter output signal streams, $D(q^{-1})$ is a matrix representing the characteristics of the controllable filter structure, $\tilde{H}(q^{-1})$ is a channel matrix constrained to have unity main diagonal and $\tilde{x}(n)$ is a vector with unknown transmitted signals filtered with main diagonal of true channel matrix $H(q^{-1})$.

A number of advantages are obtained by means of the present invention. For example, in terms of a Long Term Evolution (LTE) system, the updated channel matrix can be obtained directly after the Fast Fourier Transform (FFT) in the uplink. This means that no iteration between decoding and demodulation is required. Thus, all channel estimate improvement computations described in the present disclosure may run in parallel to other processing, such as frequency offset estimation.

BRIEF DESCRIPTION OF THE DRAWINGS

The present invention will now be described more in detail with reference to the appended drawings, where.

DETAILED DESCRIPTION

The present description will be based on the following data model of the observation:

$$y(n)=H(q^{-1})x(n)+w(n), \qquad (1)$$

where $x(n)$ is a vector of N independent transmitted signal streams at a time n, $y(n)$ is the corresponding observations subject to a frequency selective channel matrix $H(q^{-1})$, and the term $w(n)$ is a noise vector comprising interference and noise.

In equation (1), $q^{-1}$ is the so-called unit delay operator, which is defined as:

$$q^{-1}x(n)=x(n-1).$$

When using equation (1) as a data model, it is possible to estimate the channel parameters in for example a least squares sense according to equation (2) below during a pilot block.

$$\hat{\theta} = \underset{\theta}{\mathrm{argmin}} E\|y(n) - H(q^{-1};\theta)\cdot x(n)\|^2, \qquad (2)$$

where $\theta$ is a parameterization of the channel model. Equation (2) states that the estimated parameters are obtained by minimizing the mean square error.

The obtained estimate $\hat{\theta}$ is expected to be close to a true parameter vector $\theta_0$.

To elaborate on the model described by equation (1), the noise sequence $w(n)$ can be removed. Removing the noise means that a perfect input output relation is at hand. Moreover, if no randomness is assumed in the channel matrix $H(q^{-1})$, then knowing the input, $x(n)$ and output $y(n)$ means that the channel is perfectly known, the problem of finding the channel matrix $H(q^{-1})$ being deterministic. However, in the event of a random input (still no additive noise) the problem is non-deterministic. A class of possible methods to solve the latter random problem is known as source separation techniques.

To combat uncertainties in the channel estimate, one can assume some underlying behaviour of the channel, described by a model. An example is to model channel changes as a linear trend between two channel estimates. These estimates can for example be based on two consecutive time instances where pilots are available. In addition to modelling the trend, it is of course possible to consider more general regression models. An alternative to regression-based methods is to use demodulated and possibly decoded user data. In such methods, the data is demodulated and used as pilot sequences, since the data is known after demodulation. This means that the additive noise becomes available, and in case the noise contains information (colour), this can be used to improve the channel estimate.

In the reminder of the present description, it is assumed that the transmitted signal streams are mutually uncorrelated or mutually independent.

Evidently, it is possible to identify the system by knowing that the input signal to the system conforms to some regularity conditions. However, in a communication scenario, the noise term $w(n)$ is present and can not be removed, and then a source separation becomes more difficult.

A pre-filtering is a filter which can be applied prior to a processing block such as a source separation algorithm. One purpose of this filter is that it is acting on a signal such that the (possibly multidimensional) covariance function is nonzero for time lag zero only. The pre-whitening is a method which essentially transforms the observation according to equation (3) below:

$$P(q^{-1})y(n)=P(q^{-1})H(q^{-1})x(n)+P(q^{-1})w(n) \qquad (3)$$

where $P(q^{-1})$ is a matrix that transforms the noise into a temporal and spatial white sequence. Hence, the data model now conforms to data subject to a channel in additive white noise.

It is assumed that that an appropriate initial channel estimate $\hat{H}(q^{-1})$, and a pre-whitening filter $\hat{P}(q^{-1})$ are available.

Figure 1:
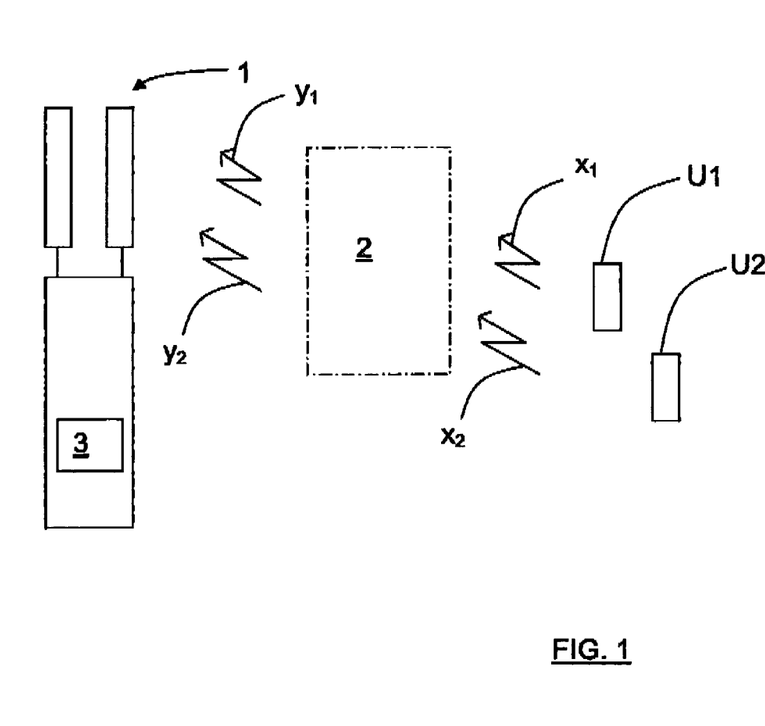
FIG. 1 schematically shows a node in a wireless communication network.

With reference to FIG. 1, a node 1 in a wireless communication network is arranged to receive two signals $y_1(n)$, $y_2(n)$ which correspond to two transmitted uncorrelated signal streams $x_1(n)$, $x_2(n)$. These transmitted uncorrelated signal streams $x_1(n)$, $x_2(n)$ are transmitted to the node 1 from user terminals U1, U2 via a channel 2 which is represented by the channel matrix $H(q^{-1})$. In other words, for simplicity, the explanation is limited to a two layer scenario, although this of course is not limited for the scope of the present invention. This means, in this example, that either one user has two streams of data or two users each has one stream of data.

The received signal vector $$y(n) = \begin{bmatrix} y_1(n) \\ y_2(n) \end{bmatrix}$$

may be written as $$y(n) = H(q^{-1}) \cdot x(n) + w(n) \qquad (4)$$

$$= \begin{bmatrix} h_{11}(q^{-1}) & h_{12}(q^{-1}) \\ h_{21}(q^{-1}) & h_{22}(q^{-1}) \end{bmatrix} \begin{bmatrix} x_1(n) \\ x_2(n) \end{bmatrix} + w(n).$$

The use of pre-whitening leads to the following pre-whitened observation:

$$P(q^{-1})y(n) = P(q^{-1}) \cdot H(q^{-1}) \cdot x(n) + P(q^{-1})w(n) = \qquad (5)$$

$$= \begin{bmatrix} p_{11}(q^{-1}) & p_{12}(q^{-1}) \\ p_{21}(q^{-1}) & p_{22}(q^{-1}) \end{bmatrix} \begin{bmatrix} h_{11}(q^{-1}) & h_{12}(q^{-1}) \\ h_{21}(q^{-1}) & h_{22}(q^{-1}) \end{bmatrix}$$

$$\begin{bmatrix} x_1(n) \\ x_2(n) \end{bmatrix} + \tilde{w}(n),$$

where $\tilde{w}(n)$ is vector of mutually uncorrelated white noise sequences. The pre-whitened observation vector in equation (5) can be reformulated as $$\tilde{y}(n) = \tilde{H}(q^{-1})\tilde{x}(n) + \tilde{w}(n), \quad (6)$$

where $$\tilde{H}(q^{-1}) = \begin{bmatrix} 1 & \dfrac{h_{12}(q^{-1})p_{11}(q^{-1}) + h_{22}(q^{-1})p_{12}(q^{-1})}{h_{11}(q^{-1})p_{11}(q^{-1}) + h_{21}(q^{-1})p_{12}(q^{-1})} \\ \dfrac{h_{11}(q^{-1})p_{21}(q^{-1}) + h_{21}(q^{-1})p_{22}(q^{-1})}{h_{12}(q^{-1})p_{21}(q^{-1}) + h_{22}(q^{-1})p_{22}(q^{-1})} & 1 \end{bmatrix} \quad (7)$$

$$= \begin{bmatrix} 1 & \tilde{h}_{12}(q^{-1}) \\ \tilde{h}_{21}(q^{-1}) & 1 \end{bmatrix}$$

and $$\tilde{x}(n) = \begin{bmatrix} x_1(n)[h_{11}(q^{-1})p_{11}(q^{-1}) + h_{21}(q^{-1})p_{12}(q^{-1})] \\ x_2(n)[h_{12}(q^{-1})p_{21}(q^{-1}) + h_{22}(q^{-1})p_{22}(q^{-1})] \end{bmatrix}. \quad (8)$$

It is to be noted that the entries in $\tilde{x}(n)$ are uncorrelated, as the entries in $x(n)$ are known, and that the factors in $\tilde{x}(n)$ are known. Furthermore, $\tilde{H}(q^{-1})$ have diagonal entries which each equals to 1.

Figure 2:
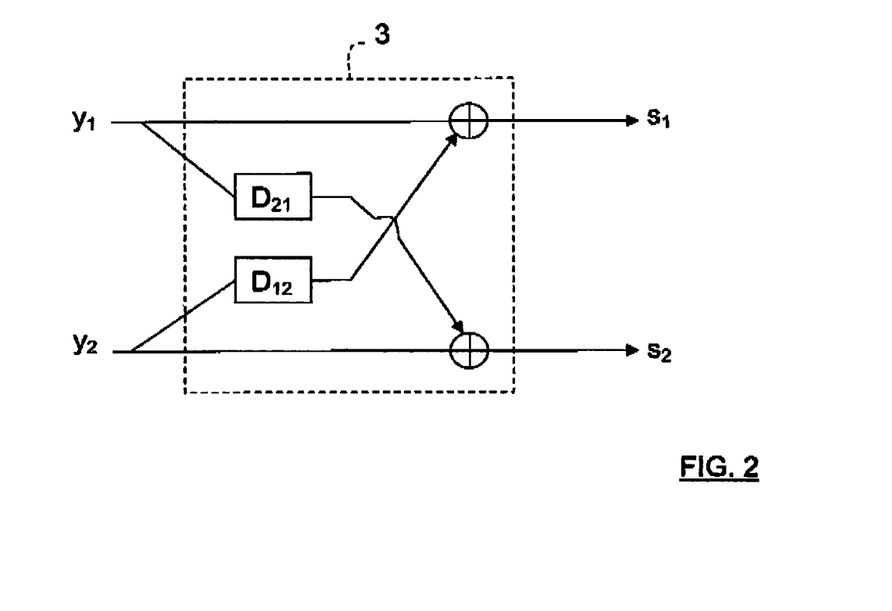
FIG. 2 schematically shows a controllable filter structure.

According to the present invention, with reference to FIG. 2, the node 1 comprises a controllable filter structure 3 that is arranged to diagonalize the channel matrix $H(q^{-1})$ such that a channel matrix estimation $\hat{H}(q^{-1})$ may be obtained. Diagonalizing the channel matrix $H(q^{-1})$ here means that the product of the characteristics of the controllable filter structure and the channel matrix $H(q^{-1})$ is a diagonal matrix. The characteristics of the controllable filter structure is expressed as a filter function vector $D(q^{-1})$.

This will now be described in greater detail, still with reference to FIG. 2. The signal vector $\tilde{y}(n)$ with its two components $y_1(n)$, $y_2(n)$ is input into the filter structure 3, while its output signal vector $s(n)$ comprises the two components $s_1(n)$, $s_2(n)$. The functionality of the filter structure is expressed as $$s(n) = D(q^{-1})\tilde{H}(q^{-1})\tilde{x}(n) = D(q^{-1})\tilde{y}(n), \quad (9)$$

with the filter function vector $$D(q^{-1}) = \begin{bmatrix} 1 & d_{12}(q^{-1}) \\ d_{21}(q^{-1}) & 1 \end{bmatrix},$$

where $$\tilde{y}_1(n) = \tilde{x}_1(n) + \tilde{h}_{12}(q^{-1})\tilde{x}_2(n)$$

and where $$\tilde{y}_2(n) = \tilde{x}_2(n) + \tilde{h}_{21}(q^{-1})\tilde{x}_1(n).$$

Furthermore, in order to diagonalize the channel matrix $H(q^{-1})$, a certain filter function vector $D(q^{-1})$ has to be calculated. The two components $s_1(n)$, $s_2(n)$ of the output signal vector $s(n)$ may thus be written as:

$$s_1(n) = \tilde{y}_1(n) + d_{12}(q^{-1})\tilde{y}_2(n) = \quad (10)$$
$$= \tilde{x}_1(n) + \tilde{h}_{12}(q^{-1})\tilde{x}_2(n) - d_{12}(q^{-1})(\tilde{x}_2(n) + \tilde{h}_{21}(q^{-1})\tilde{x}_1(n)) =$$
$$= (1 + \tilde{h}_{21}(q^{-1})d_{12}(q^{-1}))\tilde{x}_1(n) + (\tilde{h}_{12}(q^{-1}) - d_{12}(q^{-1}))\tilde{x}_2(n).$$

if
$$\tilde{h}_{12}(q^{-1}) = \tilde{d}_{12}(q^{-1}),$$
then
$$s_1(n) = (1 + \tilde{h}_{21}(q^{-1})\tilde{h}_{12}(q^{-1}))\tilde{x}_1(n).$$
In the same way, if
$$\tilde{h}_{21}(q^{-1}) = \tilde{d}_{21}(q^{-1}),$$
then
$$s_2(n) = (1 + \tilde{h}_{12}(q^{-1})\tilde{h}_{21}(q^{-1}))\tilde{x}_1(n).$$

It follows from the above that, as a certain implementation of the present invention, it is possible to control the two components $s_1(n)$, $s_2(n)$ of the output signal vector $s(n)$ by changing the characteristics of the controllable filter structure, i.e. by adjusting the filter function vector $D(q^{-1})$.

It is thus possible to adjust the filter function vector $D(q^{-1})$ such that the two components $s_1(n)$, $s_2(n)$ of the output signal vector $s(n)$ are essentially uncorrelated by measuring these two components $s_1(n)$, $s_2(n)$. Thus an estimated channel $\hat{H}(q^{-1})$ may be calculated. First, however an initial guess of a channel estimate $\hat{H}(q^{-1})$, for example by using a received pilot sequence, has to be made.

The present invention may be carried out by means of the following steps:
1. Computing a channel estimate $\hat{H}(q^{-1})$ using a received pilot sequence.
2. Computing a pre-whitening matrix $P(q^{-1})$ from an estimated noise covariance $C_w(k)$.
3. Using the effective channel $P(q^{-1})\hat{H}(q^{-1})$ as an a initial estimate of a noiseless system compensated for the support of the separation structure and
4. Using said initial estimate when starting to adjust the filter function vector $D(q^{-1})$ such that the two components $s_1(n)$, $s_2(n)$ of the output signal vector $s(n)$ are essentially uncorrelated. The adjustment is carried out until the next pilot sequence is received.

The procedure 1-4 above is preferably repeated for each received pilot sequence, such that the filter function vector $D(q^{-1})$ is adjusted for changes in the channel between two pilot sequences.

The matrix in equation (7) contains, in general, Infinite Impulse Response (IIR) filters on the off diagonals. In order for such a filter to be causal and stable, all poles must be inside the unit circle. Furthermore, all zeros must also be inside the unit circle to guarantee a stable inverse. Hence, the filter must be minimum phase. Since these filters here are approximated by Finite Impulse Response (FIR) filters, the problem is described as a source separation problem with white additive noise. Namely, there are two observed mixtures of the mutually independent source signals.

To separate the observations into replicas of the sources, a separation structure is used. To compute the parameters of the separation, a source separation criterion is used. This criterion is a function measuring how well the source signals $\tilde{x}(n)$ have been separated. When the criterion is based on second order statistics, it is based on correlation functions. The goal is to mutually decorrelate the vector $\tilde{y}(n)$.

One approach is to add a separation system, which can be represented by a matrix multiplication. Hence, $$s(n) = D(q^{-1}; \theta) \cdot \tilde{y}(n), \quad (11)$$

where the vector s(n) eventually contains the separated source signals and $D(q^{-1}; \theta)$ is a separation filter matrix for which the parameters have been aggregated in the vector $\theta$. One possible structure for $D(q^{-1}; \theta)$ is $$|\hat{H}(q^{-1};\theta)| \cdot \hat{H}^{-1}(q^{-1};\theta).$$

A criterion for separation of two source signal is $$V(\theta) = \sum_{k \in \Omega} |C_{12}(k)|^2 + \beta |\theta - \theta_0|^2 \qquad (12)$$

where $C_{12}(k)$ is the covariance of the two time functions in s(n) and $\Omega$ is the set of lags not affected by the white noise. The second term in equation (12) is a regularization of the criterion, the non negative scalar $\beta$ is a design parameter. The set $\Omega$ is defined by the separation structure $D(q^{-1}; \theta)$ and the undesired noise $\tilde{w}(n)$. Since the separation structure operates on the noise process, it is straightforward to determine what lags that are affected by the noise.

This follows directly from the computation of the covariance $C_{12}(k)$. A rule of thumb is that $\Omega = \{k: |k| > L\}$, where L is the maximum delay of the filters in the separation structure $D(q^{-1})$.

The blind tracking of the channel is controlled by equation (12) for example by deriving the parameter update $$\frac{\partial V}{\partial \theta}.$$

Since the initial value of $\tilde{H}(q^{-1})$ is available, this can initialize the separation structure as $D(q^{-1}; \theta_0)$.

The present invention is applicable in the context of Multiple Input Multiple Output (MIMO). The basic concept of the invention is to consider the pilot-based estimate as a fix-point around which the channel model parameters vary. The variation of the model parameters is blindly tracked by considering the user data streams as independent and by using temporal correlation of additive noise, interference and user data streams.

Generally, the present invention relates to a node 1 that comprises a controllable filter structure 3 that is arranged to diagonalize the channel matrix $H(q^{-1})$ such that a channel matrix estimation ($\hat{H}(q^{-1})$) may be obtained.

In particular, the present invention may preferably be used to adjust the filter function vector $D(q^{-1})$ such that the two components $s_1(n)$, $s_2(n)$ of the output signal vector s(n) are essentially uncorrelated.

Figure 3:
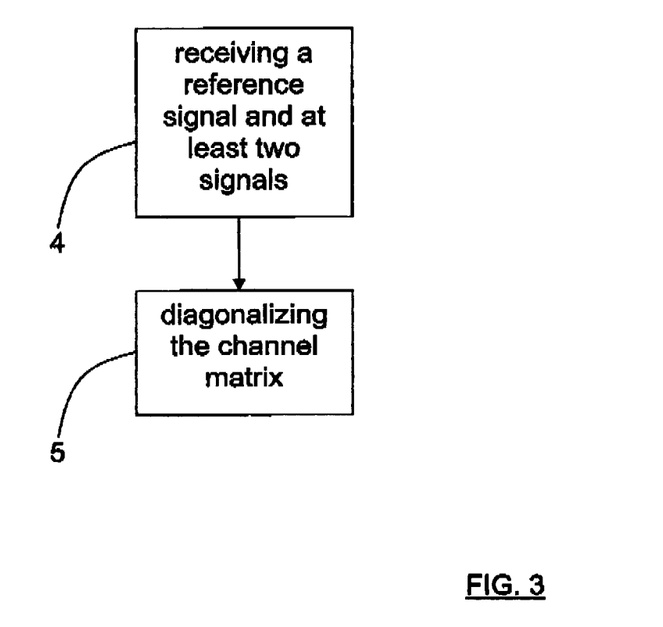
FIG. 3 schematically shows a flow-chart of a method according to the present invention.

With reference to FIG. 3, the present invention also relates to a method for a node 1 in a wireless communication network, where the method comprises the step:

4: receiving at least two signals ($y_1(n)$, $y_2(n)$) at the node (1), which signals ($y_1(n)$, $y_2(n)$) correspond to at least two transmitted uncorrelated signal streams ($x_1(n)$, $x_2(n)$) which have been transmitted to the node (1) via a channel (2), which channel (2) is represented by means of a channel matrix ($H(q^{-1})$), and 5: diagonalizing the channel matrix ($H(q^{-1})$) using a controllable filter structure (3) such that a channel matrix estimation ($\hat{H}(q^{-1})$) may be obtained.

The present invention is not limited to the description above, but may vary freely within the scope of the appended claims.

For example, the number of signal streams that are processed by means of the present invention may be more than the two described in the example. This means that there could be a number of signal streams from only one user or from more than one user; in FIG. 1 two users U1, U2 are shown as an example.

The present invention is applicable for LTE. It may for example also be used for GSM/EDGE (Global System for Mobile communications/Enhanced Data rates for GSM Evolution), WCDMA (Wide Code Division Multiple Access), CDMA2000 (Code Division Multiple Access 2000), WLAN (Wireless Local Area Network), WiMAX (Worldwide Interoperability for Microwave Access), and IMT-advanced (International Mobile Telecommunications-Advanced).

The pilot sequence is generally in the form of a reference signal.

The invention claimed is:

1. A node in a wireless communication network, the node comprising:
   a controllable filter structure that is arranged to diagonalize a channel matrix ($H(q^{-1})$) such that a channel matrix estimation ($\hat{H}(q^{-1})$) is obtained, wherein said controllable filter structure is fed with an initial channel estimate $\hat{H}(q^{-1})$ obtained by a received reference signal, wherein
   the node is arranged to receive said reference signal and at least two signals ($y_1(n)$, $y_2(n)$) which correspond to at least two transmitted uncorrelated signal streams ($x_1(n)$, $x_2(n)$) which have been transmitted to the node via a channel represented by the channel matrix ($H(q^{-1})$), wherein
   the controllable filter structure has filter output signal streams (s1(*n*), s2(*n*)) that correspond to said transmitted uncorrelated signal streams x1(*n*), x2(*n*)), where the filter structure is controlled such that the filter output signal streams (s1(*n*), s2(*n*)) are substantial uncorrelated.

2. The node according to claim 1, wherein the received signals ($y_1(n)$, $y_2(n)$) comprise noise (w(n)), where the node is arranged to pre-whiten the received signals ($y_1(n)$, $y_2(n)$) such that the noise (w(n)) is transformed to a temporal and spatial white sequence.

3. The node according to claim 2, wherein the pre-whitening of said received signals are performed such that $$P(q_{-1}) \cdot y(n) = P(q^{-1}) \cdot H(q^{-1}) \cdot x(n) + \tilde{w}(n),$$

where $P(q^{-1})$ is a pre-whitening matrix, y(n) is a vector comprising the received signals ($y_1(n)$, $y_2(n)$), x(n) is a vector comprising the transmitted signals ($x_1(n)$, $x_2(n)$), and $\tilde{w}(n)$ is the transformed noise.

4. The node according to claim 1, wherein the filter output signal streams are derived as $$s(n) = D(q^{-1}) \cdot \tilde{H}(q^{-1}) \cdot \tilde{x}(n),$$

where s(n) is a vector comprising the filter output signal streams ($s_1(n)$, $s_2(n)$), $D(q^{-1})$ is a matrix representing the characteristics of the controllable filter structure, $\tilde{H}(q^{-1})$ is a channel matrix constrained to have unity main diagonal and $\tilde{x}(n)$ is a vector with unknown transmitted signals filtered with main diagonal of true channel matrix $H(q^{-1})$.

5. The node according to claim 1, wherein the node is arranged to adjust the controllable filter structure between received reference signals.

6. A method for a node in a wireless communication network, comprising:
   receiving a reference signal and at least two signals ($y_1(n)$, $y_2(n)$) at the node, which signals ($y_1(n)$, $y_2(n)$) correspond to at least two transmitted uncorrelated signal streams ($x_1(n)$, $x_2(n)$) which have been transmitted to the node via a channel, which channel is represented by means of a channel matrix ($H(q^{-1})$); and diagonalizing the channel matrix ($H(q^{-1})$) using a controllable filter structure such that a channel matrix estimation ($\hat{H}(q^{-1})$) is obtained, wherein said controllable filter structure is fed with an initial channel estimate $\hat{H}(q^{-1})$ obtained by using said received reference signal, and the controllable filter structure has filter output signal streams (s1(*n*), s2(*n*)) that correspond to said transmitted uncorrelated signal streams (x1(*n*), x2(*n*)), where the filter structure is controlled such that the filter output signal streams (s1(*n*), s2(*n*)) are substantially uncorrelated.

7. The method according to claim 6, wherein the received signals ($y_1(n)$, $y_2(n)$) are pre-whitened such that noise (w(n)) in the received signals ($y_1(n)$, $y_2(n)$) is transformed to a temporal and spatial white sequence.

8. The method according to claim 7, wherein the pre-whitening of said received signals are performed such that $$P(q^{-1}) \cdot y(n) = P(q_{-1}) \cdot H(q^{-1}) \cdot x(n) + \tilde{w}(n),$$

where $P(q^{-1})$ is a pre-whitening matrix, y(n) is a vector comprising the received signals ($y_1(n)$, $y_2(n)$), x(n) is a vector comprising the transmitted signals ($x_1(n)$, $x_2(n)$) and $\tilde{w}(n)$ is the transformed noise.

9. The method according to claim 6, wherein using the characteristics of the controllable filter structure at a certain moment, the channel matrix estimation ($\hat{H}(q^{-1})$) is calculated for that moment.

10. The method according to claim 6, wherein the controllable filter structure is adjusted between received reference signals.

11. The node according to claim 1, wherein diagonalizing the channel matrix ($H(q^{-1})$) includes producing a diagonal matrix having diagonal entries that are equal to 1.

12. The method according to claim 6, wherein diagonalizing the channel matrix ($H(q^{-1})$) includes producing a diagonal matrix having diagonal entries that are equal to 1.

13. The node according to claim 1, wherein the at least two transmitted uncorrelated signal streams ($x_1(n)$, $x_2(n)$) are each transmitted from different user terminals.

14. The method according to claim 6, wherein the at least two transmitted uncorrelated signal streams ($x_1(n)$, $x_2(n)$) are each transmitted from different user terminals.

15. The node according to claim 1, wherein the controllable filter structure includes a diagonalized filter function vector applied to the at least two signals ($y_1(n)$, $y_2(n)$) to obtain filter output signal streams ($s_1(n)$, $s_2(n)$).

16. The method according to claim 6, wherein the controllable filter structure includes a diagonalized filter function vector applied to the at least two signals ($y_1(n)$, $y_2(n)$) to obtain filter output signal streams ($s_1(n)$, $s_2(n)$).

\* \* \* \* \*

UNITED STATES PATENT AND TRADEMARK OFFICE
CERTIFICATE OF CORRECTION

PATENT NO. : 9,184,947 B2
APPLICATION NO. : 13/502432
DATED : November 10, 2015
INVENTOR(S) : Lindgren et al.

It is certified that error appears in the above-identified patent and that said Letters Patent is hereby corrected as shown below:

On the title page item 57, under "ABSTRACT", in Column 2, Line 6, delete "(2) is signals" and insert -- (2) is --, therefor.

In the specification

In Column 1, Line 9, delete "States and." and insert -- States. --, therefor.

In Column 2, Line 46, delete "$P(q^{-1}) \cdot y(n) \uparrow P(q^{-1}) \cdot H(q^{-1}) \cdot x(n) + \tilde{w}(n),$" and insert -- $P(q^{-1}) \cdot y(n) = P(q^{-1}) \cdot H(q^{-1}) \cdot x(n) + \tilde{w}(n),$ --, therefor.

In Column 2, Line 61, delete "$s(n) = D(q^{-1}) \cdot \tilde{H}(q^{-1}) \cdot x(\tilde{n}),$" and insert -- $s(n) = D(q^{-1}) \cdot \tilde{H}(q^{-1}) \cdot \tilde{x}(n),$ --, therefor.

In Column 3, Line 27, in Equation (1), delete "$y(n) = H(q^1)x(n) + w(n),$" and insert -- $y(n) = H(q^{-1})x(n) + w(n),$ --, therefor.

In Column 5, Line 49, in Equation (9), delete "$s(n) = D(q^{-1})\tilde{H}(q^{-1})\tilde{x}(n) = D(q^{-1})\tilde{y}(\tilde{n}),$" and insert -- $s(n) = D(q^{-1})\tilde{H}(q^{-1})\tilde{x}(n) = D(q^{-1})\tilde{y}(n),$ --, therefor.

In Column 6, Line 37, delete "structure and" and insert -- structure, and --, therefor.

In the claims

In Column 8, Line 32, in Claim 1, delete "x1(n), x2(n))," and insert -- (x1(n), x2(n)), --, therefor.

Signed and Sealed this
Eighth Day of March, 2016

Michelle K. Lee
*Director of the United States Patent and Trademark Office*

In Column 8, Line 34, in Claim 1, delete "substantial" and insert -- substantially --, therefor.

In Column 8, Line 42, in Claim 3, delete "$P(q_{-1}) \cdot y(n) = P(q^{-1}) \cdot H(q^{-1}) \cdot x(n) + \tilde{w}(n),$" and insert -- $\mathbf{P}(q^{-1}) \cdot \mathbf{y}(n) = \mathbf{P}(q^{-1}) \cdot \mathbf{H}(q^{-1}) \cdot \mathbf{x}(n) + \tilde{\mathbf{w}}(n)$ --, therefor.